US006968551B2

(12) United States Patent
Hediger et al.

(10) Patent No.: US 6,968,551 B2
(45) Date of Patent: Nov. 22, 2005

(54) SYSTEM AND USER INTERFACE FOR GENERATION AND PROCESSING OF SOFTWARE APPLICATION INSTALLATION INSTRUCTIONS

(76) Inventors: John Hediger, 1430 Bliegh Ave., Philadelphia, PA (US) 19111; Mark E. Smith, 618 Firethorn Dr., Douglassville, PA (US) 19518

( * ) Notice: Subject to any disclaimer, the term of this patent is extended or adjusted under 35 U.S.C. 154(b) by 581 days.

(21) Appl. No.: 09/931,965

(22) Filed: Aug. 17, 2001

(65) Prior Publication Data
US 2002/0188939 A1 Dec. 12, 2002

Related U.S. Application Data

(60) Provisional application No. 60/297,300, filed on Jun. 11, 2001.

(51) Int. Cl.$^7$ ............................................. G06F 9/445
(52) U.S. Cl. ................................................... 717/174
(58) Field of Search ........ 717/174–178; 709/200–203; 707/1, 100, 3, 200

(56) References Cited

U.S. PATENT DOCUMENTS

| 5,384,823 A | | 1/1995 | Brenski et al. ................ 379/10 |
| 5,390,240 A | * | 2/1995 | Sensney ..................... 379/93.14 |
| 5,835,911 A | | 11/1998 | Nakagawa et al. .......... 707/203 |
| 5,870,611 A | | 2/1999 | London Shrader et al. . 395/712 |
| 5,950,010 A | * | 9/1999 | Hesse et al. ................ 717/178 |
| 5,974,454 A | | 10/1999 | Apfel et al. ................ 709/221 |
| 6,006,035 A | * | 12/1999 | Nabahi ........................ 717/175 |
| 6,018,712 A | | 1/2000 | Pactong .......................... 705/1 |
| 6,051,032 A | | 4/2000 | Harrison et al. .............. 717/11 |
| 6,117,187 A | | 9/2000 | Staelin ......................... 717/11 |
| 6,158,001 A | | 12/2000 | Lee et al. ....................... 713/1 |
| 6,202,070 B1 | | 3/2001 | Nguyen et al. ............. 707/104 |
| 6,237,144 B1 | * | 5/2001 | Delo ........................... 717/174 |
| 6,434,598 B1 | * | 8/2002 | Gish ........................... 709/203 |
| 6,560,754 B1 | * | 5/2003 | Hakewill et al. .............. 716/4 |
| 6,567,860 B1 | * | 5/2003 | Maxwell et al. ............ 719/327 |
| 6,622,199 B1 | * | 9/2003 | Spall et al. .................. 711/103 |

FOREIGN PATENT DOCUMENTS

EP 1 001 336 A 5/2000

OTHER PUBLICATIONS

SmartStart Scripting Toolkit the eASIer way COMPAW PS White Paper Mar. 2001.
"Setup Factory" User's Guide Indigorose Software Design, No. 2, Mar. 1998, pp. I-IV 5,-84, XP002908149.
International Search Report.

* cited by examiner

Primary Examiner—Wei Y. Zhen
(74) Attorney, Agent, or Firm—Alexander J. Burke

(57) ABSTRACT

The present invention allows developers of user installable software interfaces to generate end user installation procedures and documentation for the interface through a software solution. The method of the present invention reads interface configuration data present within a description of the interface and creates an installation guide that reflects that interface as it then exists. Guide creation may occur in real-time. In a preferred embodiment, the method of the present invention for automated generation of installation instructions for an interface comprises deriving installation related information from configuration data associated with the interface; retrieving template installation instruction information from a persistent data store; and incorporating the derived installation related information into the template installation information to form an installation instruction data file that may be formatted in numerous ways.

21 Claims, 4 Drawing Sheets

SYSTEM AND USER INTERFACE FOR GENERATION AND PROCESSING OF SOFTWARE APPLICATION INSTALLATION INSTRUCTIONS

PRIORITY

This application claims priority through U.S. Provisional Application No. 60/297,300 filed by Mark E. Smith et al. on Jun. 11, 2001 for "A System And User Interface For Generation And Processing Of Software Application Installation Instructions."

BACKGROUND OF THE INVENTION

The present invention relates to the field of software application installation automation. More specifically, it relates to the field of automated generation of installation instructions and installation documentation for software application interfaces.

Software applications are typically designed to execute within an environment created by an operating system. Numerous methods have been proposed and implemented to automate the installation of software applications into those environments, including documenting the install process. Although numerous methods and systems have been proposed in the prior art to automate many of the stages of software application development such as testing or library version maintenance, creation of the installation instructions for an executable software application, usually a final step in software application creation, has been largely underdeveloped.

Creation of software application installation documentation such as for a software interface application is not a simple task. Care must be taken to include documentation of all files associated with the software application, their respective expected or required installation destination, e.g. directory or folder, and the like. Software tools of the prior art may address creation of portions of the installation process but focus on packaging the software itself for the install, e.g. by supplying a "laundry list" of what goes where when the software is installed.

The prior art also requires an initial authoring of documentation including installation documentation followed by manual technical edits, one or more processes to include the edited documentation in a larger overall manual, distribution of the documentation, and ongoing maintenance and support. In times of updates to the software application, revision of installation documentation can be costly and involve a significant investment in labor and time.

As used herein, an "integration engine" is a software environment, as that term is understood by those of ordinary skill in the software programming arts, that allows integration and/or interoperability of disparate applications, e.g. a patient tracking application that can coexist with a separate billing application. These disparate applications may be executable in an identical operating system environment or in different operating system environments and may have compatible or incompatible data file formats.

As further used herein, an "interface" comprises software applications that provide a set of integration engine capabilities. By way of example and not limitation, one or more interfaces executing in an integration engine may provide two other software applications that could otherwise not operate cooperatively with the ability to operate cooperatively, including in real-time, and pass data between those systems, including providing for protocol translations and data mapping between the application systems.

In a typical prior art software application installation, an installation interface is created to help users install the software application both accurately and easily. Creation of such an installation interface typically comprises creating an installation "wizard" as that term is understood by those of ordinary skill in the software programming arts, such as by using a wizard-making facility within the MICROSOFT® VISUAL STUDIO environment. Creation of the wizard typically further comprises creation of installation prompts a software application installer must answer to set up environment specific values, by way of example and not limitation including a name of an environment being connected to, TCP/IP addresses, file locations, and the like.

A further typical component of making an installation interface is the creation and distribution of end-user installation documentation. However, creating such user documentation for installing interfaces on an integration engine is a typically manual process, e.g. a developer must document the steps that an installer must follow to successfully install an interface. Moreover, a manual update of installation documentation occurs every time a change is introduced to an interface where the install procedures are changed. This process is time consuming and lends itself to having documentation and the software being out of sync. This process is also prone to error because often a plurality of people write it, usually over time, and the documentation is based on each person's interpretation of the software, whether or not it is accurate or agrees with the prior interpretations.

There is therefore a need to automatically generate the documentation necessary for a software application installation, e.g. scripts, once a software application is completed or updated where the processes do not focus on packaging the software for the install and supplying a "laundry list." There is also a need to reduce manual technical edits as well as reduce processes to include the edited documentation in a larger overall manual, distribution of the documentation, and ongoing support.

Accordingly, there is a need for an automated installation instructions generation tool that provides an installer with installation considerations based on configuration information that are resolved before going forward with the install. There is also a need for an automated installation instructions generation tool that documents prompts that will be asked of the installer the install progresses.

SUMMARY

The present invention comprises a system for automated generation of installation instructions and documentation for a software interface as well as a method of using the system to automatically generate the instructions and/or documentation required to install the interface. In a preferred embodiment, the system comprises configuration data for a software application; a template into which data derived from the configuration data will be incorporated; a computer system comprising a memory and a processor; and software executable in the computer system for creating one or more data files that contain installation data derived from the configuration data and incorporated into the template.

In a preferred embodiment, the method of the present invention comprises deriving installation related information from configuration data associated with the interface to be installed; retrieving template installation instruction information from a persistent data store; incorporating the derived installation related information into the template installation information to form installation instruction data and/or installation documentation; and storing the derived installation instruction data such as for output to a printer or video display.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF THE PREFERRED EMBODIMENT

In general, throughout this description, if an item is described as implemented in software, it can equally well be implemented as hardware.

Figure 1:
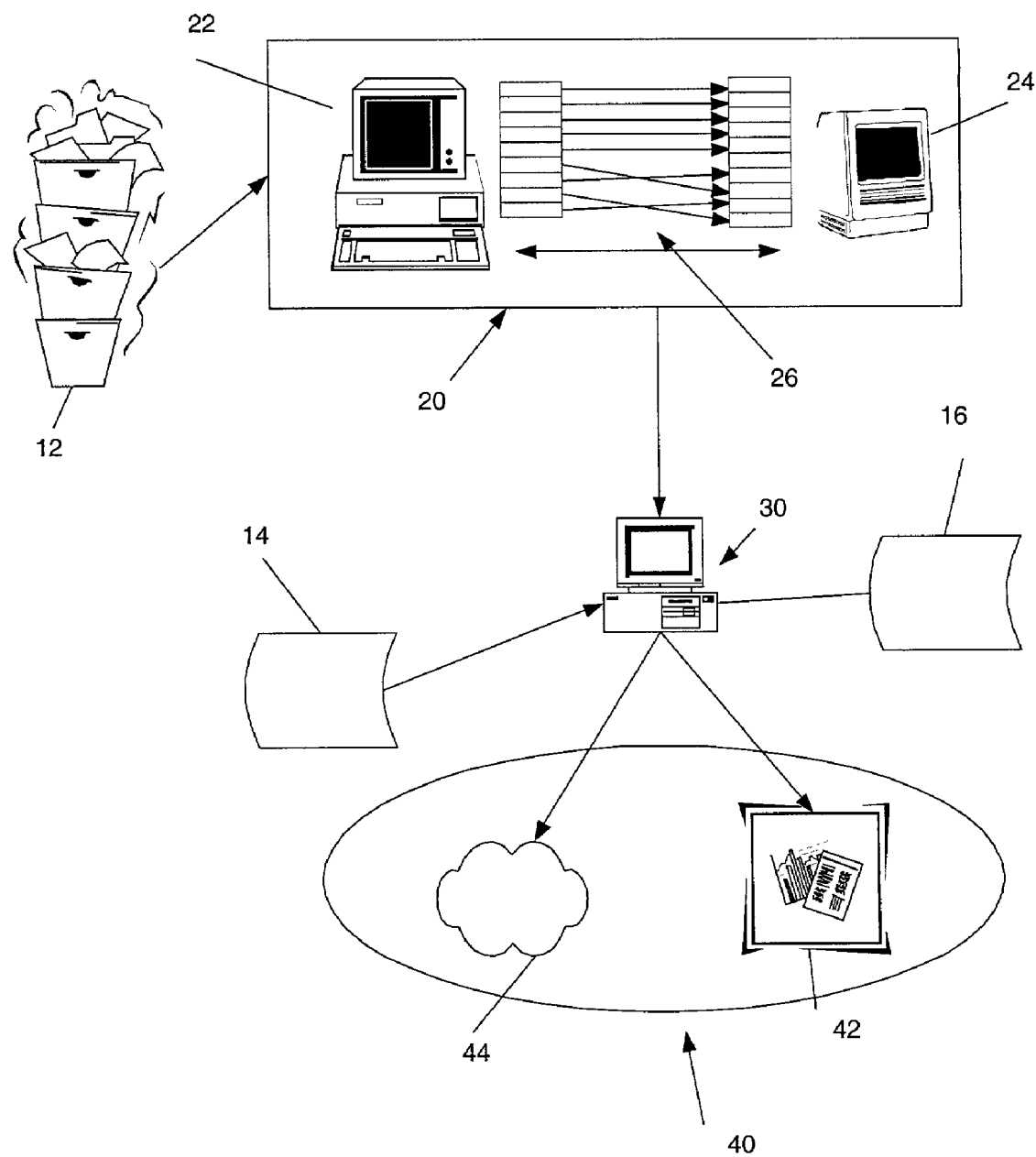
FIG. 1 is a schematic overview of an exemplary embodiment of the present invention.

Referring now to FIG. 1, the present invention's method replaces a manual documentation process with a software tool that incorporates interface information, e.g. data format definitions or protocol definitions, for a selected interface into an install template 14. As used herein, a "template" 14 is a data file in which certain predetermined portions of the data are selectively replaceable. By way of example and not limitation, template 14 may be a MICROSOFT® WORD document comprising WORD fields where the fields' values are satisfied by the present invention's method using interface configuration data 12. Using templates 14, in a preferred embodiment the present invention can create installation documentation output 40 in a variety of formats, by way of example and not limitation including word processing formats 42 such as Rich Text Format or MICROSOFT® WORD and Internet document formats 44 such as HTML or XML formats.

In a preferred embodiment the present invention executes on workstation 30 having access to one or more templates 14 stored on one or more persistent data stores as well as to one or more databases containing interface configuration data 12. It is anticipated that in some situations the present invention may be installed on the same system 30 as the interface to be documented. As will be understood by those of ordinary skill in the computer arts, the persistent data store comprises fixed and portable/removable magnetic media such as hard drives, diskettes, and tape; optical media such as CDROM or DVD media; solid state media; or any combination thereof. As will further be understood by those of ordinary skill in the computer arts, templates 14 may reside in a single template file or a plurality of template files, and these files may reside in a single folder or location or in a plurality of folders or locations.

Interface configuration data 12 comprises representations, definitions, and descriptions about the actual interface that will be installed. Configuration data 12 may comprise data representing, by way of example and not limitation: a defined directory or folder in which the application software is to be installed; the identity of files associated with that software, which may further comprise the location of these files; connectivity information, by way of example and not limitation comprising protocols to be used such as TCP/IP, SNA/SDLC, ASYNC, DECNET, DQM, or FTP; connectivity considerations for the appropriate protocols, further comprising communications settings to be used; suggested environmental settings to optimize performance of the software application; installation prompts and/or questions the installing user may be asked to respond to when installing the interface/software; or the like or a combination thereof. By way of example and not limitation, in a preferred embodiment an application development process involves the creation of an interface between two applications or application systems and the installation of that interface. The interface information may comprise definitions of connectivity, delivery mechanisms, possible data translations and/or manipulation, default behavior definitions needed for the installation of the interface and interoperability of the targeted applications, and the like, or combinations thereof for the two applications. Accordingly, the present invention can generate installation documentation 40 specific to an interface, e.g. these two applications.

In the preferred embodiment, the present invention is used with an integration engine that facilitates data exchange between a plurality of disparate systems. Accordingly, as described more fully herein below, the method of the present invention may also be used to redistribute or map data from one system such as system 22 to match what the other system, e.g. system 24, requires. By way of example and not limitation, the present invention provides a map data mechanism 26 for data translation, e.g. translations of a word or phrase such as "MALE" from a first system 22 to an alternative word or phrase such as "M" for a second system 24. In a preferred embodiment, map data mechanism 26, which may comprise a mapped data table and a mapping process, allows associating items of the derived installation related information and corresponding locations in the installation information of template 14 for use in incorporating the derived installation related information into the installation information of template 14.

Accordingly, the present invention may be used to provide up-to-date documentation 40 that substantially eliminates the possibility that documentation 40 does not match the interface. It may also be used to lessen the possibility that installation documentation 40 will get misplaced or destroyed. Additionally, the present invention may also be used to enable a developer or other party to automatically generate installation documentation 40 for other entities, by way of example and not limitation including for use where a central location could develop an interface solution and send the interface along with its documentation 40 to multiple-entity customer sites. Each of these multiple-entity customer sites could then use the present invention to generate procedures to install the interface.

Accordingly, the present invention further helps substantially eliminate a part of the development process, thus reducing the development time and expense. By way of example and not limitation, in the prior art, a development process may allow for substantially immediate delivery of updated model interfaces such as through a "customer-only" web page or LOTUS® NOTES™ database. However, updates to documentation typically can lag behind by days or months. The present invention may be used to allow an installer of interfaces to automatically create "real-time" documentation 40 reflecting all changes, substantially eliminating the cost of installation documentation distribution.

In the preferred embodiment, as only the details change from one interface to another, e.g. data in configuration data 12, support requirements may be reduced, in part because the process of installing an interface will be consistent with installation of other interfaces. Multi-entity users may further use the present invention to update templates 14, thereby creating their own templates 14 that can be used to generate documentation 40 for interfaces that the users might create.

In a preferred embodiment, the present invention may further be used to dynamically generate installation documentation 40 for an interface by using a generic or shell template 14 tailored to the interface and merging information found in the interface's configuration data 12 with template 14 to create documentation 40.

Figure 2:
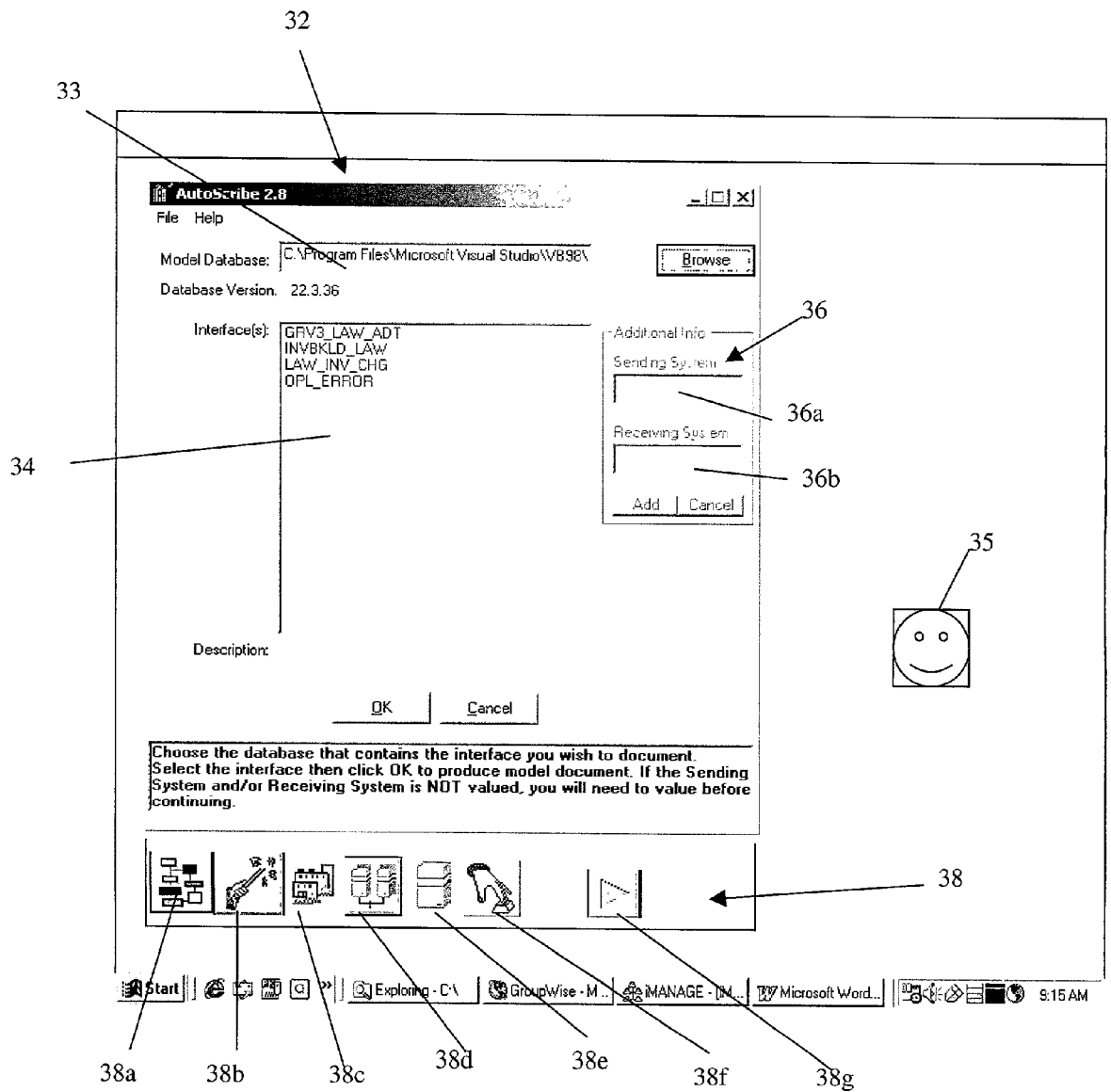
FIG. 2 is an exemplary view of an exemplary iconographic interface and data form.

Referring now to an exemplary iconographic interface and data form in FIG. 2, in a preferred embodiment, by way of further example and not limitation, the user interface of the present invention may include one or more forms such as form 32. Invocation of various functions of the present invention's method may be via iconographic interfaces such as at 38 at least in part, although any method known in the software arts may be used. By way of example and not limitation, a user wanting to generate automated installation instruction documentation 40 (shown in FIG. 1) using the present invention's method may initiate the present invention's method by invoking an icon such as 38a or 35 to open a session. In a similar manner, the user may retrieve installation instruction information for template 14 from storage by using icon 38c, where the installation instruction information includes prompt questions 16 (shown in FIG. 1) for answer by an installation user upon installation of the application. In turn, the user may then invoke an interface selection menu, such as by using icon 38d.

When those processes are completed, the user may then initiate, such as by using icon 38f, deriving installation related information from configuration data 12 (shown in FIG. 1) associated with the application and incorporating the derived installation related information into the template installation information, such as with icon 38g, to form the application installation instructions. Results may be stored, such as by using icon 38e, for later retrieval or use. In some situations, the user may invoke a wizard, such as by selection of icon 38b, to guide the user through at least some portion of the present invention's method.

In this example, form 32 may itself appear after being invoked by an icon, e.g. icon 38d, and provide for selection 33 of a database 12 (shown in FIG. 1) from multiple available databases 12 as well as describing interfaces 34 within the selected database 12 and allowing selection of one or more of those interfaces. Additionally, form 32 may provide for definition of additional installation information, shown in form 32 as providing for definition of sending systems, such as at 36a, and receiving systems, such as at 36b.

Figure 3:
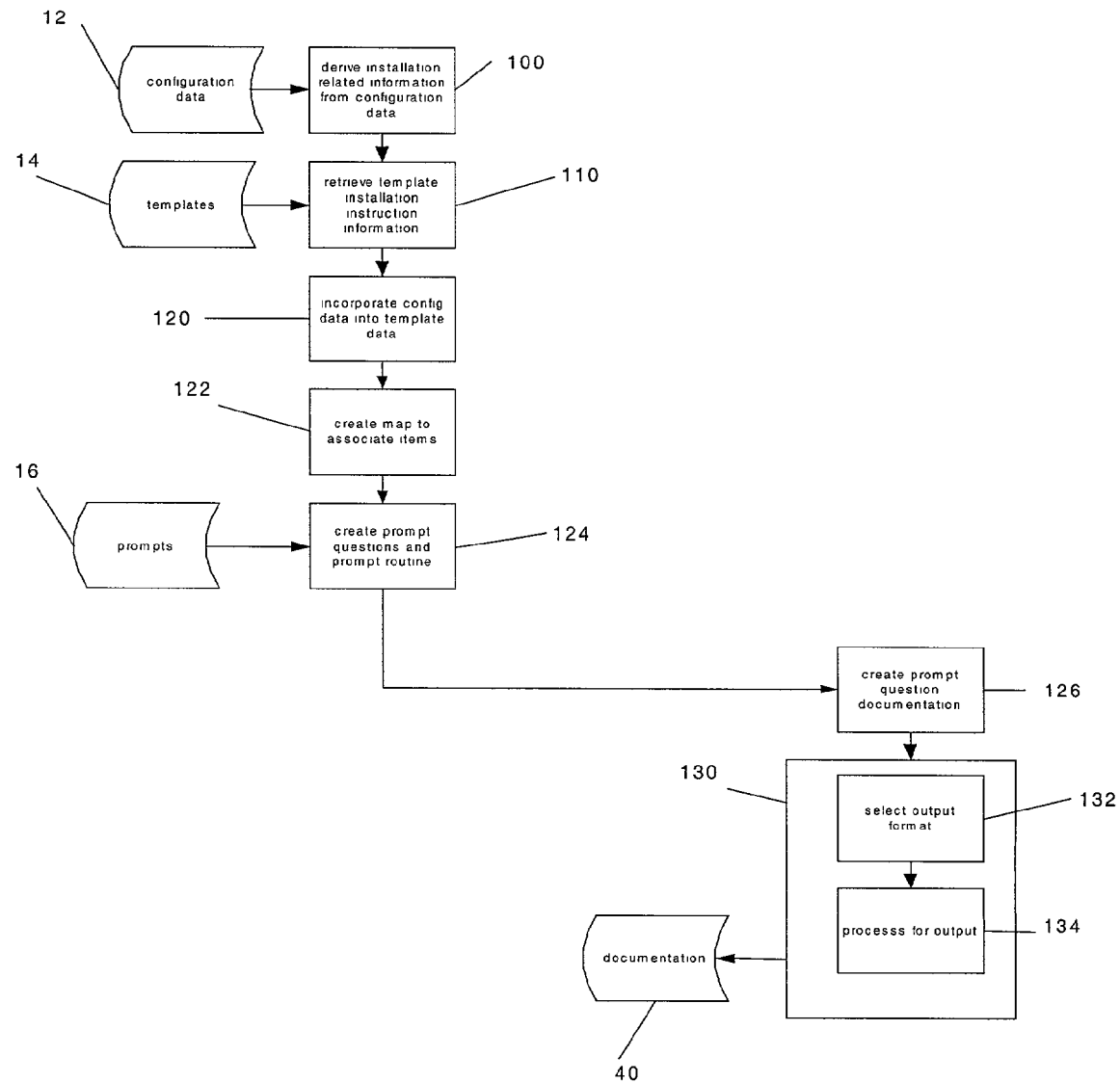
FIG. 3 is a flow diagram of an exemplary embodiment of the present invention.

In the operation of an exemplary embodiment, referring now to a flowchart of an exemplary embodiment of the present invention's method in FIG. 3, the method of the present invention incorporates information derived from configuration data 12 into installation instruction information in template 14, generating a new document set 40 that comprises predetermined text installation instructions as well as optionally comprising an executable procedure for generating installation instructions upon procedure execution.

The present invention derives installation related information 100 from configuration data 12 associated with an application. One or more templates 14 are retrieved 110 from a data store, and then derived installation data are incorporated 120 into template 14 to generate documents 40 representing installation instructions and documentation 130. Additionally, the documentation creator may permit selection of one or more templates 14 containing installation instruction information for template 14 from a plurality of files containing a corresponding plurality of installation instruction documentation templates 14.

In a currently preferred embodiment, these newly generated documents 40 may be stored for future use. In a currently envisioned alternative embodiment, documents 40 along with prompts and other routines as described herein, if any, may additionally be generated contemporaneously during an install of an interface.

By way of example and not limitation, installation data from configuration data 12 may comprise a plurality of data, including: an identity of a directory to contain the interface; an identity of data files used by and/or constituting the interface; an identity of communication protocols to be used by the interface; communication settings used by the interface, including during its installation; suggested performance enhancement settings for the interface; prompting questions to be answered by a user upon installation of the interface; and the like, or a combination thereof.

Referring now to FIG. 1 and FIG. 3, in an embodiment of the present invention's method, data may be linked 122 between a first application system, e.g. 22, and one or more second application systems, e.g. 24. Data linking in this manner supports interoperability between systems that use different data formats, e.g. ASCII mapped to EBCDIC; different protocols, e.g. TCP/IP mapped to SNA/SDLC; different data field characteristics, e.g. INTEGER to CHARACTER; and the like, or a combination thereof.

In a currently preferred embodiment, the method of the present invention permits creating a prompt question generating routine 124 for inclusion in the installation instruction data. This may be accomplished by incorporating prompt questions 16 into a predetermined question prompting procedure where the prompt questions 16 are to be answered by a user upon installation of the application. These prompt questions 16 may be derived from configuration data 12 and may be selected from a larger set of prompt questions 16. If prompt questions 16 are generated, documentation 40 documenting the prompt questions 16 themselves may be created 126 as well for inclusion in the installation instruction data.

In addition to the steps outlined above, in a currently preferred embodiment the method of the present invention may also create a prompt question generating routine 124 for inclusion in the installation instruction data by incorporating prompt questions 16 into a predetermined question prompting procedure. These prompt questions 16 will be answered by a user upon installation of the application. In the preferred embodiment, these prompt questions 16 may be of a "fill in the value" type where variable data cannot be known prior to installation, e.g. a particular folder into which one or more files will be installed or a TCP/IP address that cannot be determined before an install.

In a currently preferred embodiment, prompt questions 16 to be answered by a user upon installation of the application are derived from configuration data 12. Additionally, documentation 40 of prompt question 16 may be created for inclusion in the installation instruction data. By way of example and not limitation, prompt question documentation 40 comprises text string explanations of that for which a prompt is presented, e.g. "TCP/IP REMOTE ADDRESS—Please enter the 4-part TCP/IP address of the system that this connection will be communicating with.;"

text strings describing the form of the answer to the prompt, e.g. "NETWORK DATA PACKET—Please enter the Data Packet String in the following format: 'bbCRTRrrhhss, rr=region code, hh=hospital code, ss=system ID;" text strings containing values or range of values allowed for an answer, e.g. "GOOD JOB SYS NAME—valid node names are SMSNDMI (ISC), SMSCDR1 (RCO1), or SMSCRD2 (RCO2);" or the like, or a combination thereof.

Figure 4:
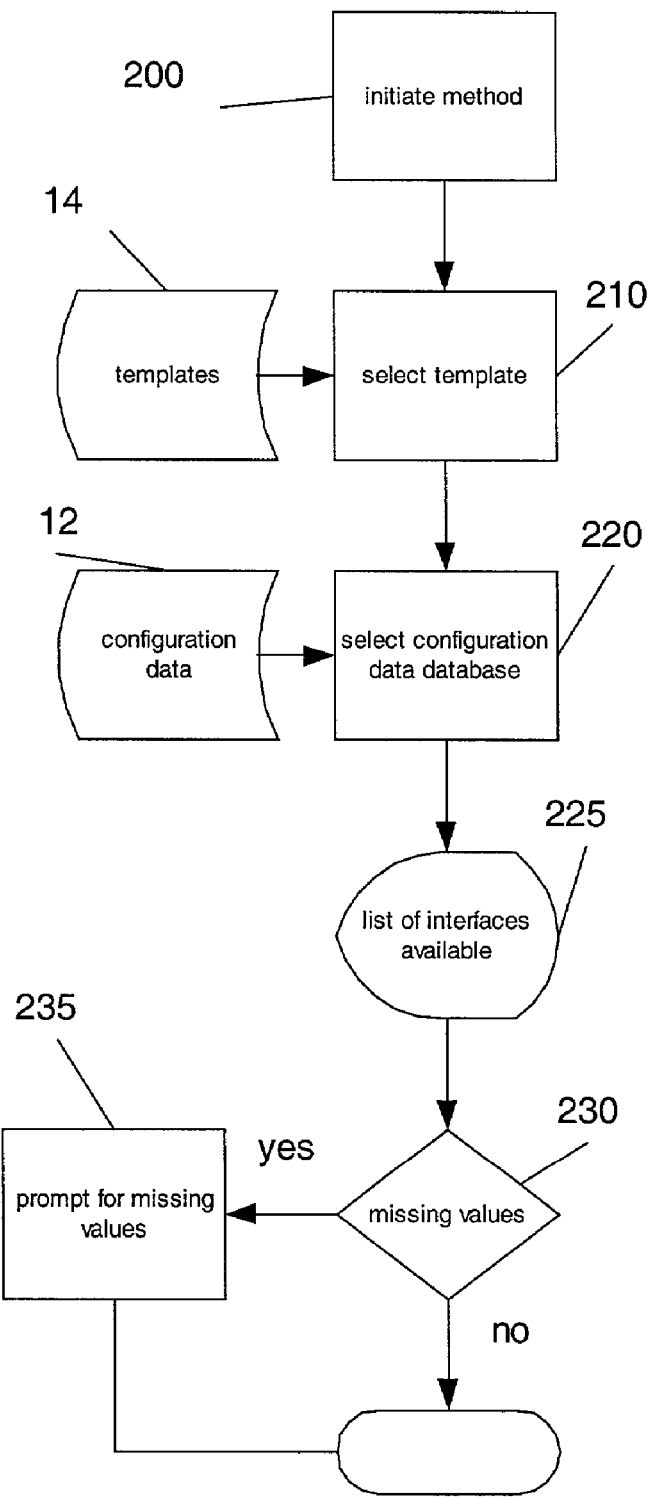
FIG. 4 is a flow diagram of an exemplary embodiment of the user interface method present invention.

Referring now to a flowchart of an exemplary user interface method to be used with the present invention in FIG. 4, in a preferred embodiment, a user may initiate 200 the present invention's method from an icon 35 (shown in FIG. 2) residing on their computer's "desktop," an icon present in an application screen (such as icons 38 in FIG. 2), an option selector such as a region of a displayed screen, or any other equivalent technique which will be familiar to those of ordinary skill in the programming arts. Once invoked, the user may be requested to select 210 a template 14 containing installation instruction information from one or more files containing a corresponding plurality of installation instruction documentation templates 14.

The user may then be asked to identify and select 220 a database containing configuration data 12 for use with the present invention. In the currently preferred embodiment, the database is created such as in a MICROSOFT® ACCESS format but can be any of a variety of equivalent databases or tables, all of which will be familiar to those of ordinary skill in the programming arts. After the database is selected and opened, a list of interfaces contained in the database is displayed 225 and the user asked to select the interface from which installation procedures are to be generated. A default interface may be provided.

It is understood that the sequence of asking for template 14 or configuration data 12 database and interface may be interchangeable.

Additionally, a user may be prompted for missing values 230, 235. By way of example and not limitation, for applications to be used in exchanging data between a source application and a different destination application, the method of the present invention may allow generation of prompts 16 such as at 235 to allow a user to specify data concerning the source application and the destination application, e.g. the folder and data file of the source and the folder into which the destination file(s) will be stored.

When all selections are satisfactory, the user initiates creation of an installation data file 130 such as by selecting an approval option by means familiar to those of ordinary skill in the programming arts, e.g. such as a selectable icon or button on form 2 shown in FIG. 2. Once approved, the present invention's method automatically generates interface installation documentation 40 deriving installation related information from configuration data 12 associated with the interface by incorporating the derived installation related information into the selected templates 14 to create documentation 40. In a preferred embodiment, if output 40, such as that containing installation instructions, is to be created in a data file appropriate for storage and later retrieval such as a text data file, the present invention may display an informational message informing the user where the file was stored.

Output 40 may be adapted 134 for printing, video display, audio presentation, or the like, or a combination thereof. The user may accordingly select the interface to report on and the desired output format 132. Output 40 may be created 134 in numerous document formats, by way of example and not limitation including Rich Text Format, MICROSOFT® WORD compatible format, HTML format, Extensible Mark-up Language (XML) format, and XHTML format. Further, the method of the present invention may also launch a word processor such as MICROSOFT® WORD or NOTEPAD with the document opened by the word processor. In currently envisioned alternatives, if the output format is XML, XHTML, or HTML, the present invention may launch a default Internet browser with the document contained in a browser window.

When the installation data file is created such as at step 130, installation instruction information from template 14 may comprise predetermined text installation instructions and an executable procedure for generating installation instructions upon procedure execution. In this manner, once data derived from configuration data 12 are merged in with template 14 to create the installation documentation of the present invention, a resulting output installation file or set of files may contain documentation as well as an executable procedure that generates the installation instructions when an install is taking place.

In a currently preferred embodiment, documentation created according to the exemplary steps outlined above may comprise:

a description of the intended audience for document 40, as derived from the template 14 used;

assumptions encapsulated in the template 14 used;

set-up requirements for the interface, further comprising installation questions derived from interface definitions such as from a database and interface considerations generated based on the interface definitions and the interface type;

other considerations generated from the interface definition when mapping occurs;

backup recommendations derived from the template 14 used;

support information derived from the template 14 used; and implementation instructions that further comprise test system preparation steps, test system installation steps, production system preparation steps, and production system installation steps, all or at least a portion of which are formed from an incorporation of interface definition information with information in template 14.

In currently envisioned alternative embodiments, the present invention may further provide enabling an interface developer with the ability to include customizations to interface documentation 40 for a specific interface. These customizations will then be included with the dynamically generated documentation 40. These customizations will be kept with the present invention and will be automatically pulled into the dynamically generated installation document each time the method of the present invention is invoked for that interface. The method of the present invention may save the customizations and as well as information regarding the section into which the customizations should be added.

In a currently envisioned embodiment, the method of the present invention may be invoked in response to an initial access to the interface to be documented, by insertion of a storage medium containing the present invention or interface to be documented into a processing system, or manually by a user. Upon installation of the interface, an automated install procedure may be invoked, by any of a number of equivalent methods as are familiar to those of ordinary skill in the computer arts, that may use the installation instruction documentation 40 generated by the present invention to complete the installation of that interface in response to the installation user's commands received in response to prompt questions 16 presented during the installation.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A data processor implemented method for automated generation of installation instructions for an executable software application, comprising:
   a. retrieving template installation instruction information from a persistent data store;
   b. deriving installation related information supporting data exchange between different systems from configuration data associated with the application;
   c. incorporating the derived installation related information into the template installation information to form installation instruction data; and
   d. storing the derived installation instruction data; wherein said executable software application is an interface application enabling communication and data exchange between said different systems, and said different systems comprise executable applications to be enabled to communicate using installation data extracted from the configuration data, including at least one of, (a) a communication protocol identifier and (b) communication settings for at least one of said different systems.

2. The method of claim 1, wherein step (b) further comprises extracting installation data supporting data exchange between different systems from the configuration data, the installation data comprising at least two of:
   i. an identity of a directory to contain the application;
   ii. an identity of data files comprising the application;
   iii. an identity of a communication protocol to be used by the application;
   iv. communication settings for the application;
   v. suggested performance enhancement settings for the application; and
   vi. prompting questions to be answered by a user upon installation of the application.

3. The method of claim 1, wherein
said executable software application is an interface application enabling communication between said different systems and
said different systems comprise executable applications.

4. The method of claim 1, including the step of
formatting the derived installation instruction data as installation documentation for reproduction on an output device, the output device comprising a printer and a video display.

5. The method of claim 1, wherein the derived installation instruction data comprises installation instruction text data for output as installation documentation.

6. The method of claim 5, further comprising selecting an output format for the installation documentation, the output format comprising Rich Text Format, Microsoft® Word compatible format, HTML document format, and Extensible Mark-up Language (XML) compatible format.

7. The method of claim 1 wherein step (a) further comprises selecting a file containing the template installation instruction information from a plurality of files containing a corresponding plurality of installation instruction documentation templates for interface applications supporting data exchange between different systems.

8. The method of claim 1 further comprising creating a prompt question generating routine for inclusion in the installation instruction data by incorporating prompt questions into a predetermined question prompting executable procedure, the prompt questions being for answer by a user upon installation of the application.

9. The method of claim 8 wherein the prompt questions to be answered by a user upon installation of the application are derived from the configuration data.

10. The method of claim 1 further comprising creating prompt question documentation for inclusion in the installation instruction data, the prompt question being for answer by a user upon installation of an interface application supporting data exchange between different systems.

11. The method of claim 1 further comprising providing a map for associating items of the derived installation related information and corresponding locations in the template installation information for use in incorporating the derived installation related information into the template installation information and supporting data exchange between different systems.

12. The method of claim 1, wherein
said executable software application is an interface application used in exchanging data between different systems comprising a first executable application and a different second executable application and further comprising prompting a user to select at least one of the first executable application and the second executable application.

13. The method of claim 1, wherein:
i. the system for automated generation of installation instruction documentation for an executable software application is located on a storage medium together with the application.

14. The method of claim 1 wherein the template installation instruction information comprises predetermined text installation instructions and an executable procedure for generating installation instructions upon procedure execution.

15. A data processor implemented method for automated generation of installation instructions for an executable software application, comprising:
   a. retrieving template installation instruction information from a data store, the installation instruction information including prompt questions for answer by a user upon installation of the application;
   b. deriving installation related information supporting data exchange between different systems from configuration data associated with the application;
   c. incorporating the derived installation related information into the template installation information to form installation instruction data; and
   d. presenting the installation instruction data to a user during an installation of the application; wherein said executable software application is an interface application enabling communication and data exchange between said different systems, and said different systems comprise executable applications to be enabled to communicate using installation data extracted from the configuration data, including at least one of, (a) a communication protocol identifier and (b) communication settings for at least one of said different systems.

16. The method of claim 15, further comprising creating a prompt question generating procedure for generating the prompt questions for answer by the user.

17. The method of claim 15 further comprising selecting the prompt questions from a larger set of prompt questions.

18. A user interface method performed by a data processor supporting installation of an executable software application, comprising:
  a. initiating display of application installation instructions including prompt questions for answer by a user upon installation of the application, the application installation instructions being formed by:
    i. retrieving template installation instruction information from storage,
    ii. deriving installation related information supporting data exchange between different systems from configuration data associated with the application, and
    iii. incorporating the derived installation related information into the template installation information to form the application installation instructions; and
  b. installing the executable software application in response to user command received via the displayed prompt questions; wherein said executable software application is an interface application enabling communication and data exchange between said different systems, and said different systems comprise executable applications to be enabled to communicate using installation data extracted from the configuration data, including at least one of, (a) a communication protocol identifier and (b) communication settings for at least one of said different systems.

19. A user interface method performed by a data processor supporting automated generation of installation instruction documentation for an executable software application, comprising:
  a. initiating display of application installation instructions formed by:
    i. retrieving template installation instruction information from storage, the installation instruction information including prompt questions for answer by a user upon installation of the application,
    ii. deriving installation related information supporting data exchange between different systems from configuration data associated with the application, and
    iii. incorporating the derived installation related information into the template installation information to form the application installation instructions; and
  b. initiating display of the prompt questions for answer by a user upon installation of the application; wherein said executable software application is an interface application enabling communication and data exchange between said different systems, and said different systems comprise executable applications to be enabled to communicate using installation data extracted from the configuration data, including at least one of, (a) a communication protocol identifier and (b) communication settings for at least one of said different systems.

20. The method of claim 19, wherein
  a. said executable software application is an interface application used in exchanging data between different systems comprising a first executable application and a different second executable application and
  b. the prompt questions prompt a user to select at least one of the first executable application and the second executable application.

21. A system for automated generation of installation instructions for an executable software application, comprising:
  a. configuration data for a software interface;
  b. a template, comprising documentation and data fields to receive one or more configuration data elements;
  c. a computer system comprising a memory and a processor; and
  software executable in the computer system for creating a data file containing installation data supporting data exchange between different systems derived from configuration data and incorporated into the template, the installation data comprising documentation of an installation process for the software interface; wherein said executable software application is an interface application enabling communication and data exchange between said different systems, and said different systems comprise executable applications to be enabled to communicate using installation data extracted from the configuration data, including at least one of, (a) a communication protocol identifier and (b) communication settings for at least one of said different systems.

\* \* \* \* \*